United States Patent
Yang

(12) 
(10) Patent No.: US 6,337,874 B1
(45) Date of Patent: Jan. 8, 2002

(54) OPTICAL COMPONENT WITH POLARIZATION-MAINTAINING FIBER PIGTAIL SPLICE TO REGULAR FIBER WITH GRATING

(75) Inventor: Thomas C. Yang, North Chelmsford, MA (US)

(73) Assignee: Corning Lasertron, Inc., Bedford, MA (US)

( * ) Notice: Subject to any disclaimer, the term of this patent is extended or adjusted under 35 U.S.C. 154(b) by 0 days.

(21) Appl. No.: 09/501,809

(22) Filed: Feb. 10, 2000

Related U.S. Application Data

(63) Continuation-in-part of application No. 09/396,174, filed on Sep. 14, 1999, now abandoned.
(60) Provisional application No. 60/136,628, filed on May 27, 1999.

(51) Int. Cl.$^7$ .................................. H01S 3/08
(52) U.S. Cl. ....................... 372/112; 372/6; 372/27; 372/29; 372/69
(58) Field of Search .................. 372/6, 102, 27, 372/101, 29, 69

(56) References Cited

U.S. PATENT DOCUMENTS

| | | | |
|---|---|---|---|
| 4,950,318 A | 8/1990 | Dyott | 65/4.21 |
| 5,434,876 A | 7/1995 | Atkins et al. | 372/31 |
| 5,455,835 A | 10/1995 | Atkins et al. | 372/6 |
| 5,577,057 A | 11/1996 | Frisken | 372/18 |
| 5,828,059 A | 10/1998 | Udd | 250/227.18 |
| 5,841,797 A | * 11/1998 | Ventrudo et al. | 372/6 |
| 5,870,417 A | * 2/1999 | Verdiell et al. | 372/102 |
| 6,041,070 A | * 3/2000 | Koch et al. | 372/102 |
| 6,044,093 A | * 3/2000 | Ventrudo et al. | 372/102 |
| 6,058,131 A | * 5/2000 | Pan | 372/102 |
| 6,188,712 B1 | * 1/2001 | Jiang et al. | 372/102 |

FOREIGN PATENT DOCUMENTS

| | | |
|---|---|---|
| EP | 0 522 843 A2 | 1/1993 |
| GB | 2 298 733 | 9/1996 |
| JP | 57150810 | 9/1982 |
| WO | WO 98/10242 | 12/1998 |

OTHER PUBLICATIONS

Isshiki, K., et al., "A 980–NM Band Laser Diode Pump Source with a Detuned Wavelength of 1000 NM for Praseodynium–doped Fiber Amplifiers" Journal of Lightwave Technology, US, IEEE, NY vol. 16, No. 3, Mar. 1998 pp. 401–404.

Hunziker, W., et al., "Elliptically Lensed Polarisation Maintaining Fibres", Electronics Letters, GB, IEE Stevenage, vol. 28, No. 17, Aug. 13, 1992, pp. 1654–1656.

* cited by examiner

*Primary Examiner*—Leon Scott, Jr.
(74) *Attorney, Agent, or Firm*—Hamilton Brook Smith & Reynolds, P.C.

(57) ABSTRACT

A solution for implementing gratings with optical sources where polarization-maintaining fiber is required or desirable utilizes polarization-maintaining fiber between the grating and the optical source. The grating, however, is actually written in regular, or non-polarization-maintaining fiber. The polarization-maintaining fiber is spliced to the non-PM fiber. Since this splice exists in the commercial components, it can be performed in laboratory conditions.

37 Claims, 5 Drawing Sheets

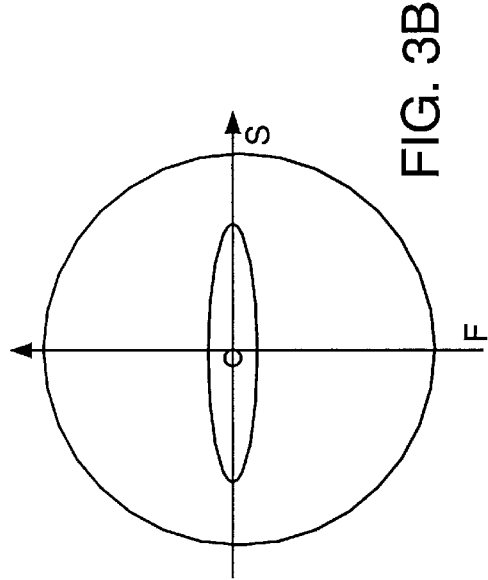
FIG. 3A PANDA
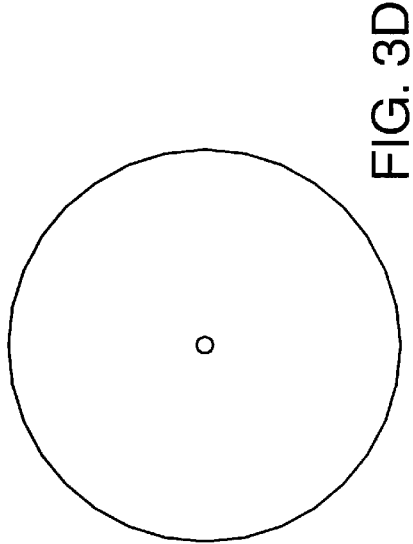
FIG. 3B 3M ELLIPTICAL STRESS BAR
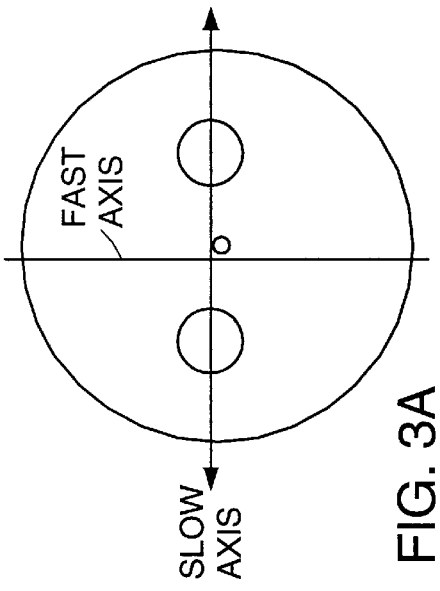
FIG. 3C BOW TIE
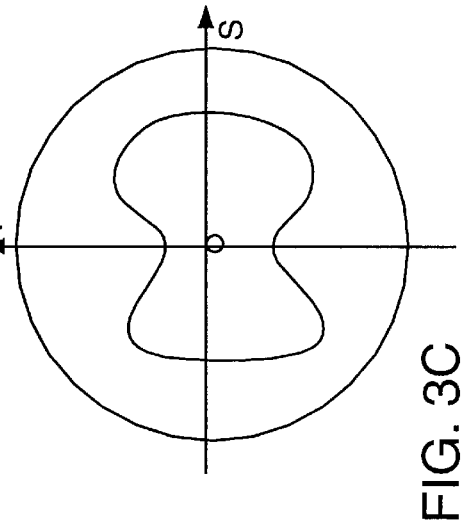
FIG. 3D REGULAR FIBER (NO STRESS BAR)

OPTICAL COMPONENT WITH POLARIZATION-MAINTAINING FIBER PIGTAIL SPLICE TO REGULAR FIBER WITH GRATING

RELATED APPLICATION

This application is a Continuation-in-Part of U.S. application Ser. No. 09/396,174, filed on Sep. 14, 1999, now ABN and claims the benefit of the filing date of Provisional Application No. 60/136,628, filed May 27, 1999, the entire teachings of which are incorporated herein by this reference.

BACKGROUND OF THE INVENTION

Laser diodes are used to optically pump optical fiber (gain fiber), which has been doped to enable amplification of light signals. In common commercial products, 980 nanometer (nm) or 1480 mn diode lasers are used to optically pump erbium-doped fiber amplifiers operating or amplifying typically in a spectral range around 1550 nm.

In these diode pump-gain fiber systems, it is important to minimize changes in the amplifier characteristics due to changes in the pump wavelength or power. This is especially true in wavelength division multiplexing (WDM) systems or dense wavelength division multiplexing (DWDM) systems comprising many, spectrally closely-spaced channels. For example, mode hopping in the pump can cause changes in the gain spectrum of the amplifier. These changes result in preferential amplification of channels relative to other channels in the DWDM system.

One solution to controlling noise and wavelength shift due to environment temperature or power changes in the pumps uses fiber-grating stabilization. The Bragg rating has the effect of stabilizing the output spectrum from the laser pump or, more specifically, the grating stabilizes the pump against temporal power fluctuations. Further, in one suggested implementation, the grating is selected, spaced from the laser module, and tuned relative to the laser's exit facet reflectivity so that the spectrum of the emission is broadened relative to that of a solitary laser.

To further stabilize pump lasers, polarization control is many times useful. The light emitted from the output facet of the diode lasers is typically highly polarized. The polarization of the light propagating through regular, non-polarization maintaining fiber, however, can change its orientation due to fiber birefringence, fiber twisting, bending, temperature shifts, and other stresses. Any fluctuation in the polarization of the light returning to the optical device from the grating effectively changes the feedback power ratio, because the laser is insensitive to any reflected light that has polarization orthogonal to that of the emitted light. For example, if all of the reflected light has its polarization rotated by 90 degrees, the fiber Bragg grating is effectively removed from the system from the standpoint of the laser.

In applications where polarization control is required between the laser diode and the grating, polarization-maintaining (PM) fiber is used for the fiber pigtail, with the grating being written into the PM fiber.

It should be appreciated, however, that the need for polarization control between optical devices and fiber gratings is not limited to pump lasers. These issues also concern general laser diodes or any fiber system (such as fiber amplifiers) with fiber grating stabilization for narrow line to coherence collapse operation and systems utilizing amplifiers such as Fabry-Perot lasers.

SUMMARY OF THE INVENTION

As a general rule, optical component manufacturers have resisted the use of polarization-maintaining fiber with fiber gratings. There are a number of justifications for this. Gratings are relatively hard to write in PM fiber, which impacts component cost. Further, narrowband gratings written in PM fiber will have reflectivity peaks at two discrete wavelengths, one for each polarization axis, because the birefringence results in a different effective grating pitch for each axis. This effect has an impact on operation if the source's polarization is not aligned with the fast or slow axis of the fiber. Moreover, in many situations, the customer may not want to splice to PM fiber because of the high splice loss associated with fusing regular fiber to PM fiber in the field and/or expense associated with field deployment of sophisticated fusion splicing gear and the training required for the technicians.

Consequently, the use of PM fiber in fiber-grating stabilized optical systems is only prescribed when the disadvantages associated with PM fiber deployment outweigh problems associated with having no polarization control between the optical device and grating. For example, the mechanical rigidity and temperature stability of the optical system can be increased to thereby control stress-induced birefringence and consequently stabilize feedback from the grating into the diode laser, thus decreasing the need for polarization control. The long-term stability of these solutions, however, is unclear.

The present invention is directed to a solution for implementing gratings with optical sources where polarization-maintaining fiber is required or desirable.

Specifically, polarization-maintaining fiber is used between the grating and the optical source. The grating, however, is actually written in regular, or non-polarization-maintaining fiber. In one embodiment, the polarization-maintaining fiber is spliced directly to the non-PM fiber. Since this splice exists in the components, it can be performed in laboratory or production conditions, which preferably use a dedicated fusion splicer with controlled processes.

In general, according to one aspect, the invention features a fiber-grating stabilized optical component. This component comprises an optical source or system from which light is supplied. Depending on the implementation, optical sources or systems, such as lasers, specifically 980 nm~1480 run or Raman pump lasers, or amplifiers are used. Light from the optical source or system is transmitted through a polarization-maintaining fiber pigtail, which provides the desirable polarization control. Non-polarization-maintaining fiber is then coupled to the polarization-maintaining fiber, either directly or indirectly. The required grating is written into the non-polarization-maintaining fiber. The grating is used to affect the spectral characteristics of the light emitted from the optical component.

In the preferred embodiment, the non-polarization maintaining fiber is directly spliced to the polarization-maintaining fiber. In the current implementation, fusion splicing is used.

In the anticipated implementation, a module housing is used to contain the optical source. The polarization-maintaining fiber pigtail extends through a wall of this housing to terminate in proximity to the output facet of the laser source. Various techniques can be used to maximize the efficiency with which light from the optical source is coupled into the polarization-maintaining fiber, such as discrete lenses, butt coupling, and microlenses (formed or attached) at the end of the fiber pigtail.

Preferably, the grating is located within a distance of 1.0 or 0.50 meters, but typically the grating is less than 150 millimeters, from the junction between the polarization-maintaining fiber pigtail and the non-polarization-maintaining fiber. This ensures that the polarization control between the optical source and the grating is maximized.

In general, according to another aspect, the invention is also directed to a fibergrating-stabilized pump laser. This laser comprises a diode laser that generates light to optically-pump a fiber amplifier. A module houses the diode laser. A polarization-maintaining fiber pigtail extends through a wall of the module to terminate in proximity to an output facet of the diode laser to receive at least a portion of the light it generates. Non-polarization-maintaining fiber is optically coupled, directly or indirectly, to the polarization-maintaining fiber pigtail and a grating is written into the non-polarization-maintaining fiber to provide the desired polarization control.

Preferably, the grating has a power reflectivity of about 1.3% to 2.3%, preferably 1.4% to 2.0%. The front facet power reflectivity of the laser chip is 4.0% to 6.5%, preferably 4.5% to 6.0%. These ranges are used with a laser-to-fiber coupling efficiency of 70–75%.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings:

FIGS. 3A–3D are schematic, cross-sectional views of a few exemplary PM and non-PM fibers;

DETAILED DESCRIPTION OF THE PREFERRED EMBODIMENTS

Figure 1:
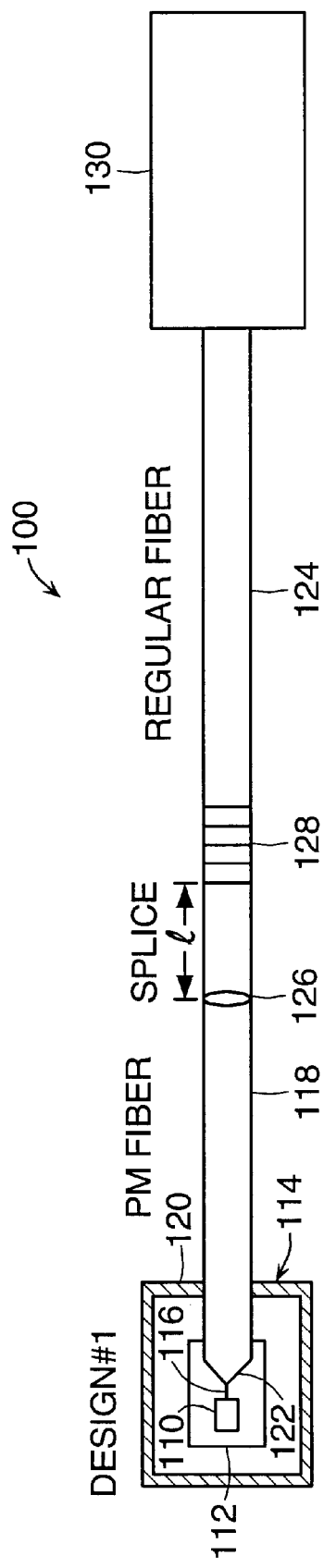
FIG. 1 is a block diagram of the fiber-grating stabilized pump laser component according to the present invention.
Figure 2:
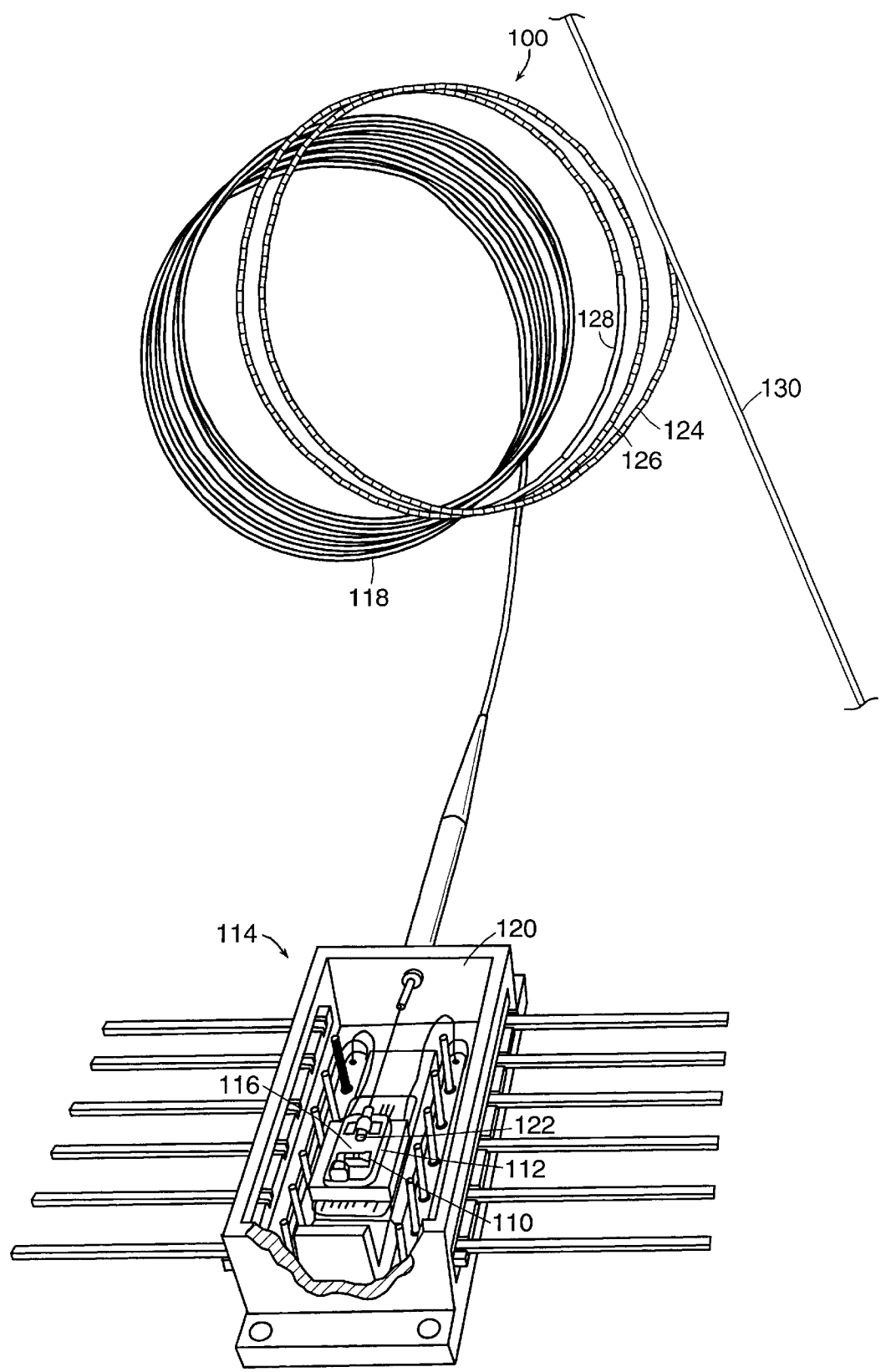
FIG. 2 is a perspective, schematic view of the fiber-grating stabilized pump laser component according to the present invention.

FIGS. 1 and 2 shows a fiber-grating stabilized pump laser component, which has been constructed according to the principles of the present invention.

Specifically, an optical source 110, such as a laser, specifically, pump laser or amplifier, is installed on a sub-mount 112 in the typical implementation. The submount 112 provides mechanical and electrical connections between the laser diode 110 and the module housing 114. A fiber pigtail 118 extends through a side wall 120 of the module housing 114. It is typically rigidly secured to the submount 112 such that the fiber endface 122 is held in proximity to an output facet 116 of the laser diode 110.

The fiber pigtail 118 is constructed from polarization-maintaining fiber. Different types of polarization-maintaining fiber are applicable. For example, panda, elliptical stress bar, elliptical core, and bow tie may be used.

FIGS. 3A through 3C are cross-sectional views illustrating a few exemplary types of PM fiber deployable with the present invention, specifically panda, elliptical stress bar, and bow tie, respectively. Each of these PM fiber types is doped to yield a fast and slow axis of light transmission. Light that is coupled into the fiber and polarized along one of these axes is restricted to maintain its polarization with respect to the axes.

In other embodiments, the fiber pigtail 118 is constructed from a type of polarization-maintaining fiber that is termed polarization-controlling fiber. This fiber type only propagates light with a single polarization.

Returning to FIGS. 1 and 2, the present invention contemplates the various techniques used for ensuring a high collection efficiency for light exiting from the light output facet 116 of the laser diode into the fiber pigtail 118. Specifically, discrete lenses, butt coupling, and microlenses are various alternatives. Presently, flat top microlenses are used as described in the application entitled "Flat Top, Double-Angled, Wedge-Shaped Fiber Endface", U.S. Ser. No. 08/965,798, by Jeffrey Korn, Steven D. Conover, Wayne F. Sharfin and Thomas C. Yang, which is incorporated herein by this reference.

The advantage of double-angle flat top microlenses is the fact that they are not circularly symmetric, i.e., with respect to the fiber's axis, to thereby match the elliptical spatial distribution of light from the output facet of the laser diode.

However, cylindrical fiber lenses, a cylindrical discrete lenses can also be used.

When non-circularly symmetric coupling techniques are used, it is important to align the formed microlense, for example, with one of either the fast or slow axes of the polarization-maintaining fiber.

Figure 4:
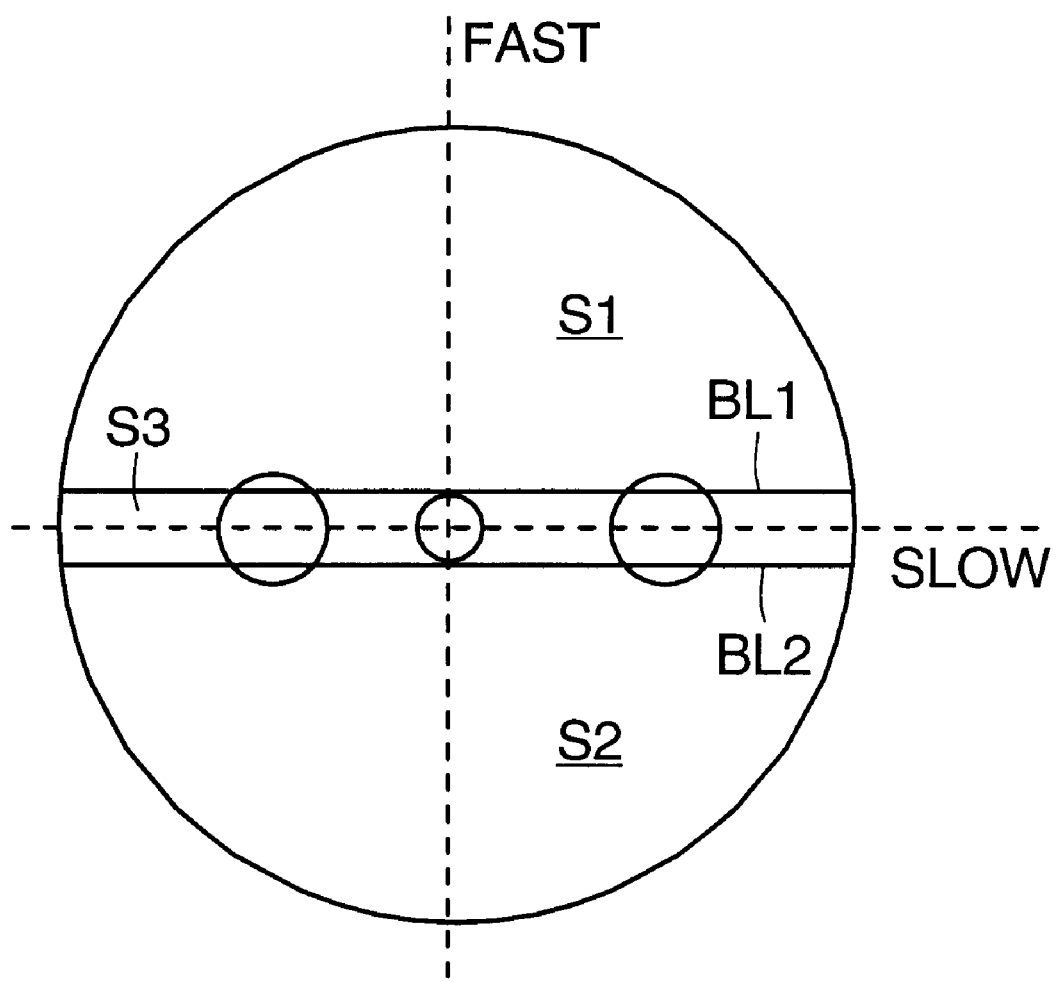
FIG. 4 is a plan view showing the relationship between the PM fiber's axes and micro lense on the end of the fiber pigtail.

FIG. 4 illustrates the relationship between the double-angle flat top microlense and the PM fiber's transmission axes. Specifically, breaklines BL1, between polished surface S1 and cleaved flat top surface S3, and breakline BL2, between top surface S3 and polished surface S2, are substantially aligned with one of the PM fiber's axes. Here, the breaklines BL1 and BL2 are aligned with the slow axis. It is equally valid to align the breaklines BL1 and BL2 with the fast axis, in alterative embodiments.

In the present invention, the accuracy of the alignment is between zero and five degrees relative to either the fast or slow axis. That is, there is less than 5 degrees of angular difference between the breaklines BL1, BL2 and the selected fiber transmission axis. Preferably, however, the alignment is between 0 and 2°. This level of alignment ensures that little light is coupled to travel along the nonfavored axis of transmission, and thus maximizing the polarization-controlling effect of the fiber pigtail 118.

The polarization control maximizes and stabilizes the effect of the fiber grating. Light exiting from the typical diode laser is polarized. As a result, any light that is coupled into the other, non-favored fiber axis, i.e., the axis of the fiber that is not aligned with the polarization of the laser diode, is reflected by the grating, but has little effect on the laser diode since the diode is nonresponsive to light of this polarization.

Returning to FIGS. 1 and 2, the polarization-maintaining fiber pigtail 118 is optically coupled to a strand of regular fiber 124 via splice 126. Regular fiber preferably has a standard circular cross section core, i.e., has no stress bar, or no fast or slow axes, as illustrated in FIG. 3D.

Although the coupling between the polarization-maintaining fiber pigtail 118 and regular, non-polarization-maintaining fiber 24 is shown as a direct fusion splice.

The critical feature is the optical coupling between the two fibers. Thus, other techniques for obtaining this coupling can be used such as intervening fiber lengths of a third fiber.

In a similar vein, the PM fiber need not directly receive the light from the diode. Instead, the light can be first coupled into a relatively short length of regular fiber for example, and then into PM fiber, which transmits the light over most of the distance to the grating. This is not preferred, however, because of the need for additional splicing.

A grating 128 is written into the regular fiber 124. These gratings are typically manufactured by UV beam interference. The gratings are usually written to the depth of the core in the fiber.

In one implementation, the fiber grating 128 provides reflectivity at about 980 nm, which is within the gain bandwidth of the diode laser 110. Further, the fiber grating has a bandwidth of 0.5–1 nm, preferably.

Preferably, the grating has a power reflectivity of about 1.3% to 2.3%, preferably 1.4% to 2.0%. The front facet power reflectivity of the laser chip is 4.0% to 6.5%, preferably 4.5% to 6.0%. These ranges are used with a laser-to-fiber coupling efficiency of 70–75%.

In other implementations, also involving erbium-doped fiber amplifiers, the grating 128 is reflective at 1480 nm. In implementations using Raman amplification, the grating has a bandwidth of 0.5–20 nm any where in the range of 1060–1600 nm.

Important to the performance of the inventive systems is the distance (1) between the splice point 126 and the grating 128. Generally, this distance should be kept short to minimize the region without polarization control between the laser diode 110 and grating 128. In the preferred embodiment, the distance (1) is 50–150 mm, but can be a wider range such as 0 mm to 500 mm.

In the preferred embodiment, the regular fiber 128 transmits the signal from the optical device 110 to the next device or system 130. In the preferred implementation, this system is a fiber amplifier system with the light being used to pump the fiber amplifier 130. For example, the diode pump component 100 can be attached to the fiber amplifier through a WDM coupler to provide the pump light into the fiber amplifier's core. Regular fiber, however, is typically used in Raman systems.

One of the primary advantages of the present invention surrounds the fact that the commercial, fiber-grating stabilized optical component 100, which is shipped to customers, contains the PM fiber to non-PM fiber splice 126. In the past, it has been common to use lengths of PM fiber for polarization control in various systems. Typically, these systems have been used in laboratory environments. PM fiber, however, was difficult to deploy in commercial systems. Many end-users do not want to splice regular fiber to PM fiber because of the difficulties associated with the fusion process, especially in the field. Further, as noted previously, there was expenses associated with PM fiber with gratings, and some PM fiber is hard to write on. In contradistinction, with the present invention, the fiber-grating stabilized pump laser component, for example, is shipped to a user in the typical implementation, with a non-PM fiber splice end. Therefore, there is no concern regarding splicing to PM fiber. Moreover, problems associated with gratings in PM fiber are avoided.

Figure 5:
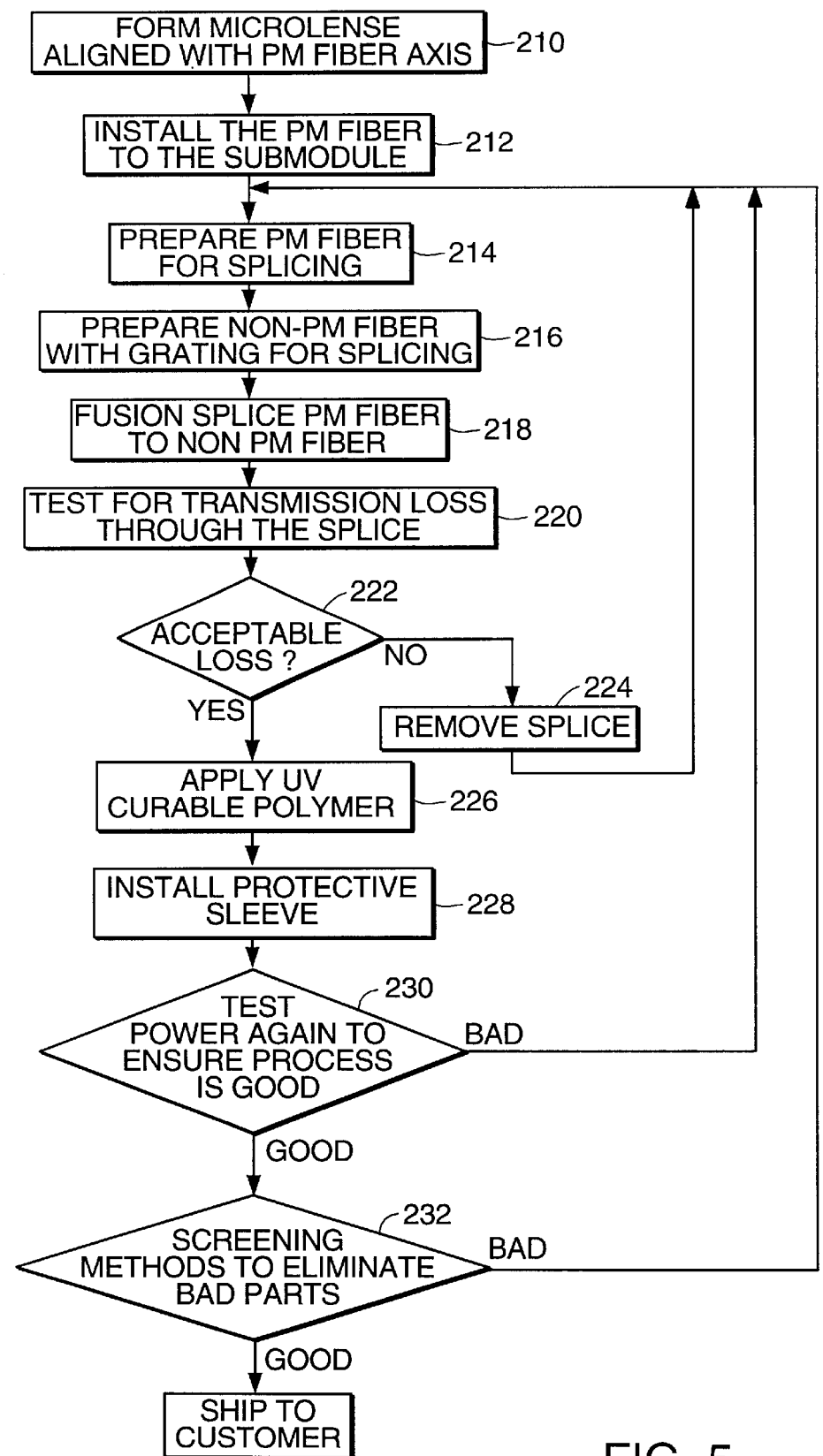
FIG. 5 is a flow diagram illustrating a process or manufacturing the fiber-grating stabilized pump laser according to the invention.

FIG. 5 is a flow diagram illustrating the process for manufacturing the optical component 100.

First, the microlense 122 is formed on the end of a length of PM-maintaining fiber. In a preferred embodiment, a flat-top, endface microlense is formed. Since this microlense is not circularly symmetric, when the microlense is polished, the PM fiber is initially installed in the polishing jig such that one of its polarization axes, either the fast axis or the slow axis, is aligned to the formed microlense, to yield an alignment as discussed in relation to FIG. 4. That is, the microlense is rotationally aligned with the polarization axes of the fiber. If polarization-controlling fiber is used, the lense is aligned to the only polarization axis.

Next, in step 212, the PM fiber pigtail 118 is installed on the submount 112. Specifically, known alignment techniques are used such that the formed microlense is located relative to the laser diode 110 such that coupling efficiency of the light generated by the laser diode is maximized into the PM fiber pigtail 118. Specifically, the microlense is located near the exit facet of the laser and rotationally aligned such that the polarized light from the laser is launched to propagate along either the fast or slow axes of the PM fiber.

The other end of the PM fiber pigtail 118 is prepared for splicing. Specifically, the outer coating and jacket of fiber is removed in step 214 leaving the bare glass.

In step 216, the non-PM fiber is also prepared for splicing. Specifically, approximately 150 mm or less of the non-PM fiber is preserved on the near, or laser, side of the grating 128. The outer coating and jacket of fiber is then removed.

Next, the PM fiber pigtail 118 is fusion spliced to the non-PM fiber 124 using conventional PM-to-non-PM fiber splicing techniques in step 218. Mechanical or flame splicing could also be used, however.

The quality of the completed splice is tested in step 220. Specifically, the laser diode is operated and the splice-related losses are characterized. If the loss is determined to be unacceptably high in step 222, the splice is removed in step 224 and the PM fiber and non-PM fiber are re-spliced using the remaining 150 mm or less of non-PM fiber on the near proximal side of the grating. Presently, splice losses of about 3% are typical.

If the splice is determined to have acceptable losses, however, an ultraviolet-curable polymer is coated over the region of the splice in step 226. Multiple coats of his protective polymer can be used to improve pull-strength.

In step 228, a protective sleeve is installed over the region of the splice.

The component is then retested to confirm acceptable power characteristics, in step 230.

Finally, in step 232, screening methods and tests are employed to remove bad parts.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A fiber-grating stabilized optical component, comprising:
   an optical source from which light is generated;
   a polarization-maintaining fiber pigtail into which the light from the optical source is coupled;
   a non-polarization-maintaining fiber that is optically coupled to the polarization-maintaining fiber pigtail; and
   a grating, written into the non-polarization-maintaining fiber, the grating providing feedback into the optical source to thereby stabilize a spectrum of light emitted from the optical component, wherein the grating is located within 500 millimeters of a junction between the polarization-maintaining fiber pigtail and the non-polarization-maintaining fiber to promote polarization control between the optical source and the grating.

2. A grating-stabilized optical component as described in claim 1, wherein the non-polarization-maintaining fiber is directly spliced to the polarization-maintaining fiber pigtail.

3. A grating-stabilized optical component as described in claim 1, wherein the optical source is a laser.

4. A grating-stabilized optical component as described in claim 1, wherein the optical source is a pump laser.

5. A grating-stabilized optical component as described in claim 1, wherein the optical source is an amplifier.

6. A grating-stabilized optical component as described in claim 1, further comprising a module housing; the optical source being housed within the module housing and the polarization-maintaining fiber pigtail extending through a wall of housing to terminate in proximity to an output facet of the optical source.

7. A grating-stabilized optical component as described in claim 1, wherein the polarization-maintaining fiber pigtail is fusion spliced directly to the non-polarization-maintaining fiber.

8. A grating-stabilized optical component as described in claim 1, wherein the grating is located within 50 millimeters of a junction between the polarization-maintaining fiber pigtail and the non-polarization-maintaining fiber.

9. A grating-stabilized optical component as described in claim 1, wherein light from the optical source is coupled directly into the polarization-maintaining fiber pigtail.

10. A grating-stabilized optical component as described in claim 1, further comprising a microlense on an end of the polarization-maintaining fiber pigtail.

11. A grating-stabilized optical component as described in claim 10, wherein the microlense is not circularly symmetric relative to an axis of the polarization-maintaining fiber pigtail.

12. A grating-stabilized optical component as described in claim 11, wherein the microlense is rotationally aligned with respect to a fast or slow axis of the polarization-maintaining fiber pigtail.

13. A grating-stabilized optical component as described in claim 11, wherein the microlense is rotationally aligned with respect to a fast or slow axis of the polarization-maintaining fiber pigtail to within 5 degrees.

14. A fiber-grating stabilized pump laser, comprising:
   a diode laser that generates light to optically pump an fiber amplifier,
   a module housing containing the diode laser;
   a polarization-maintaining fiber pigtail that extends through a wall of housing to terminate in proximity to an exit facet of the diode laser to receive at least a portion of the light it generates;
   a non-polarization-maintaining fiber that is optically coupled to the polarization-maintaining fiber pigtail; and
   a grating written into the non-polarization-maintaining fiber that stabilizes a spectrum of light emitted from the pump laser, wherein the grating is located within 500 mm from a junction between the polarization-maintaining fiber pigtail and the non-polarization-maintaining fiber to promote polarization control between the pump laser and the grating.

15. A pump laser as described in claim 14, wherein the non-polarization-maintain fiber is directly spliced to the polarization-maintaining fiber pigtail.

16. A pump laser as described in claim 14, wherein the polarization-maintaining fiber pigtail is fusion spliced directly to the non-polarization-maintaining fiber.

17. A pump laser as described in claim 14, wherein the grating is located within 50 mm from a junction between the polarization-maintaining fiber pigtail and the non-polarization-maintaining fiber.

18. A pump laser as described in claim 14, further comprising a microlense on an end of the polarization-maintaining fiber pigtail.

19. A pump laser as described in claim 18, wherein the microlense is not circularly symmetric relative to an axis of the polarization-maintaining fiber pigtail.

20. A grating-stabilized optical component as described in claim 19, wherein the microlense is rotationally aligned with respect to a fast or slow axis of the polarization-maintaining fiber pigtail.

21. A grating-stabilized optical component as described in claim 19, wherein the microlense is rotationally aligned with respect to a fast or slow axis of the polarization-maintaining fiber pigtail to within 5 degrees.

22. A method of stabilizing the output of an optical component, the method comprising:
   generating light from an optical source;
   transmitting the light from the optical source through polarization-maintaining fiber to a grating, which is written in a non-polarization-maintaining fiber, the grating providing feedback into the optical source to stabilize a spectrum of the light;
   controlling the distance between the grating and a junction between the polarization-maintaining fiber and the non-polarization-maintaining fiber to be less than 500 millimeters to promote polarization control between the optical source and the grating.

23. A method as described in claim 22, further comprising directly splicing the polarization-maintaining fiber to the non-polarization maintain fiber.

24. A method as described in claim 22, wherein the optical source is a laser.

25. A method as described in claim 22, wherein the optical source is pump laser.

26. A method as described in claim 22, further comprising:
   mounting the optical source in a module housing; and
   extending the polarization-maintaining fiber through a wall of housing to terminate in proximity to an output facet of the optical source.

27. A method as described in claim 22, further comprising fusion splicing the polarization-maintaining fiber directly to the non-polarization-maintaining fiber.

28. A method as described in claim 27, further comprising testing the fusion splice for transmission loss and re-splicing the polarization-maintaining fiber directly to the non-polarization-maintaining fiber.

29. A method as described in claim 27, further comprising performing a first attempt at fusion splicing the polarization-maintaining fiber directly to the non-polarization-maintaining fiber such that a sufficient length of non-polarization maintain fiber exists between the splice and the grating so that the polarization-maintaining fiber may be re-spliced to the non-polarization-maintaining fiber.

30. A method as described in claim 22, further comprising controlling the distance between the grating and a junction between the polarization-maintaining fiber and the non-polarization-maintaining fiber to be less than 50 millimeters.

31. A method as described in claim 22, further comprising directly coupling light from the optical source into the polarization-maintaining fiber.

32. A method as described in claim 22, further comprising forming a microlense on an end of the polarization-maintaining fiber pigtail.

33. A method as described in claim 32, wherein the microlense is not circularly symmetric relative to an axis of the polarization-maintaining fiber pigtail.

34. A method as described in claim 33, further comprising rotationally aligning the microlense with respect to a fast or slow axis of the polarization-maintaining fiber pigtail.

35. A method as described in claim 33, further comprising rotationally aligning the microlense with respect to a fast or slow axis of the polarization-maintaining fiber pigtail to within 5 degrees.

36. A fiber-grating stabilized pump laser, comprising:
a diode laser that generates light to optically pump an fiber amplifier;
a module housing containing the diode laser;
a polarization-maintaining fiber pigtail that extends through a wall of housing to terminate in proximity to an exit facet of the diode laser to receive at least a portion of the light it generates;
a non-polarization-maintaining fiber that is optically coupled to the polarization-maintaining fiber pigtail; and
a grating written into the non-polarization-maintaining fiber that stabilizes a spectrum of light emitted from the pump laser; wherein the grating is located within 500 mm from a junction between the polarization-maintaining fiber pigtail and the non-polarization-maintaining fiber to promote polarization control between the pump laser and the grating; an wherein the grating has a power reflectivity of about 1.3% to 2.3%, and the front facet power reflectivity of the diode laser about 4.0% to 6.5%.

37. A fiber-grating stabilized pump laser as described in claim 36, wherein the grating has a power reflectivity of about 1.4% to 2.0% and the front facet power reflectivity is 4.5% to 6.0%, with a laser-to-fiber coupling efficiency of 70–75%.

* * * * *